US012630030B2

(12) United States Patent
Djedovic et al.

(10) Patent No.: US 12,630,030 B2
(45) Date of Patent: May 19, 2026

(54) LOCKING DEVICE DRIVEN BY AN ELECTRIC MOTOR

(71) Applicant: KIEKERT AG, Heiligenhaus (DE)

(72) Inventors: Benjamin Djedovic, Oberhausen (DE); Tanja Schwinning, Velbert (DE)

(73) Assignee: Kiekert AG, Heiligenhaus (DE)

( * ) Notice: Subject to any disclaimer, the term of this patent is extended or adjusted under 35 U.S.C. 154(b) by 367 days.

(21) Appl. No.: 18/263,572

(22) PCT Filed: Jan. 19, 2022

(86) PCT No.: PCT/DE2022/100049
§ 371 (c)(1),
(2) Date: Jul. 31, 2023

(87) PCT Pub. No.: WO2022/171232
PCT Pub. Date: Aug. 18, 2022

(65) Prior Publication Data
US 2024/0308360 A1      Sep. 19, 2024

(30) Foreign Application Priority Data

Feb. 10, 2021     (DE) ..................... 10 2021 103 075.7

(51) Int. Cl.
B60L 53/16          (2019.01)
H01R 13/639        (2006.01)
H01R 13/641        (2006.01)

(52) U.S. Cl.
CPC ............ B60L 53/16 (2019.02); H01R 13/639 (2013.01); H01R 13/641 (2013.01); H01R 2201/26 (2013.01)

(58) Field of Classification Search
CPC ..... B60L 53/16; H01R 13/639; H01R 13/641; H01R 2201/26
See application file for complete search history.

(56) References Cited

U.S. PATENT DOCUMENTS 3,827,007 A * 7/1974 Fairbairn ............... H01R 13/28
                                                            439/295
5,516,167 A * 5/1996 Hayakawa .............. E05B 81/16
                                                            292/201
(Continued)

FOREIGN PATENT DOCUMENTS

DE       102018109661 A1    10/2019
DE       102018129671 A1     5/2020
(Continued)

OTHER PUBLICATIONS

International Search Report mailed May 27, 2022, for priority International Application No. PCT/DE2022/100049.

*Primary Examiner* — Thanh Tam T Le
(74) *Attorney, Agent, or Firm* — Renner, Otto, Boisselle & Sklar, LLP

(57)                ABSTRACT

A locking device for a plug connector half, whereby the locking device is driven by an electric motor, for establishing an electrical connection to another plug connector half in order to charge an electric vehicle or a hybrid vehicle by plugging the other plug connector half into the plug connector half. The locking device comprises a movable locking pin for locking the other plug connector half that has been plugged into the plug connector half, and a sensor element that is arranged on the locking pin and is in the form of a conductor track structure, it being possible to establish an electrical contact with the conductor track structure by means of resilient contact tabs and to provide a means for protecting the contact tabs at least in the region of the contact tabs.

16 Claims, 2 Drawing Sheets

(56)                    References Cited

U.S. PATENT DOCUMENTS

| | | | | |
|---|---|---|---|---|
| 6,419,510 | B2 * | 7/2002 | Shiraki | H01R 13/7032 |
| | | | | 439/507 |
| 6,699,059 | B2 * | 3/2004 | Nagamine | H01R 13/6273 |
| | | | | 439/352 |
| 7,108,534 | B2 * | 9/2006 | Fabian | H01R 24/84 |
| | | | | 439/295 |
| 7,628,630 | B2 * | 12/2009 | Chang | H01R 13/426 |
| | | | | 439/862 |
| 8,376,768 | B2 * | 2/2013 | Kurumizawa | B60L 53/65 |
| | | | | 439/304 |
| 9,199,551 | B2 | 12/2015 | Kahara | |
| 9,279,276 | B2 * | 3/2016 | Arabia, Jr | B60L 53/16 |
| 9,770,993 | B2 * | 9/2017 | Zhao | B60L 53/51 |
| 9,777,511 | B2 * | 10/2017 | Taylor | E05B 49/00 |
| 9,944,172 | B2 * | 4/2018 | Basavarajappa | B60L 53/68 |
| 10,236,640 | B2 * | 3/2019 | Pamart | H01R 13/71 |
| 10,270,187 | B2 * | 4/2019 | Morita | H01R 4/34 |
| 11,203,267 | B2 * | 12/2021 | Prasad | B60L 53/30 |
| 11,485,243 | B2 * | 11/2022 | Kojima | H01R 13/6397 |
| 11,491,885 | B2 * | 11/2022 | Motomiya | B60L 53/16 |
| 11,691,524 | B2 * | 7/2023 | Blakborn | H01R 13/639 |
| | | | | 439/372 |
| 11,745,607 | B2 * | 9/2023 | Führer | H01R 13/701 |
| | | | | 439/352 |
| 2015/0111408 | A1 | 4/2015 | Sasaki | |

FOREIGN PATENT DOCUMENTS

| | | | |
|---|---|---|---|
| DE | 102019215157 | A1 | 10/2020 |
| DE | 102020128580 | A1 | 5/2022 |
| EP | 2606537 | A2 | 6/2019 |

* cited by examiner

LOCKING DEVICE DRIVEN BY AN ELECTRIC MOTOR

This application is a national phase of International Application No. PCT/DE2022/100049 filed Jan. 19, 2022, which claims priority to German Patent Application No. 10 2021 103 075.7 filed Feb. 10, 2021, each of which is hereby incorporated herein by reference in its entirety.

FIELD OF DISCLOSURE

The invention relates to a locking device for a plug connector half, whereby the locking device is driven by an electric motor, for establishing an electrical connection to another plug connector half in order to charge an electric vehicle or a hybrid vehicle by plugging the other plug connector half into the plug connector half. The locking device comprises a movable locking pin for locking the other plug connector half that has been plugged into the plug connector half, and a sensor element that is arranged on the locking pin and is in the form of a conductor track structure, it being possible to establish an electrical contact with the conductor track structure by means of resilient tabs.

BACKGROUND OF DISCLOSURE

Batteries of electric or hybrid vehicles are usually charged via a charging plug as a plug connector half, wherein the charging plug can be plugged into a charging socket on the vehicle side as another plug connector half. A charging process for charging the batteries of the electric or hybrid vehicle takes a very long time compared to fueling vehicles that have an internal combustion engine. Typically, such a charging process takes several hours.

With the charging process taking that long, it is not reasonable for anyone to stand by and wait during the entire charging process. Therefore, there is a risk that the charging process may be interrupted by an unauthorized third party unplugging the charging plug from the charging socket before the batteries are fully charged. In this case, there is a risk of injury due to, for example, spark impact, in the event of charging with high currents and uncontrolled disconnection of the electrical connection.

Inserting the charging plug into the socket is usually done manually. The plug-in force required for plugging in varies depending on pole count, contact and housing design. In this respect, it may happen that the plug connector halves are not completely joined together. In that case, the electrical contact is established, but the tightness and vibration resistance of the plug connection is impaired, which can lead to failures. However, in order to be able to guarantee a safe charging process in any case, so-called locking devices are used. The locking devices secure the interlocked plug connector halves against unintentional loosening of the plug connection.

A locking device driven by an electric motor for establishing an electrical connection to another plug connector half in order to charge an electric vehicle or a hybrid vehicle has become known from DE 10 2018 109 661 A1. In this case, a transmission which moves a locking pin is driven via an electric drive. After the charging plug has been fully inserted into the charging socket, the locking pin moves in such a way that disconnection of the plug connection can be prevented by means of the locking pin. In order to secure the position of the locking pin and thus a proper connection between the charging plug and the charging socket, the position of the locking pin is continuously determined by means of a sensor.

A generic locking device has become known from the unpublished DE 10 2020 128 580.9. Here, the locking device is mounted on a plug connector half in such a way that the locking pin can be moved into and out of the plug connector half by means of an electromechanical drive. In a preferred embodiment, a conductor track structure having contact tabs is formed on the locking pin, wherein the contact tabs can be brought into engagement with conductor tracks on a housing of the locking device. The conductor track structure is formed in a U-shape and is arranged on the locking pin by means of receptacles in such a way that the contact tabs protrude resiliently from a rear side of the locking pin. In the installed state, the locking pin can be moved into the housing of the locking device in such a way that the contact tabs can be brought into engagement with the contact tabs or that the contact tabs can be moved into a region in which they are disengaged from the conductor tracks of the housing.

This locking device has proven itself in principle and can ensure secure locking of the plug connection. However, motor vehicle engineers always aim to provide cost-optimized and improved systems and thus also cost-optimized and improved locking devices. It must be possible, in particular, to ensure reliability of the systems over the entire product cycle, i.e., the entire service life of the motor vehicle. This is where the invention starts from.

SUMMARY OF DISCLOSURE

The object of the invention is to provide an improved electromechanically driven locking device. In particular, it is the object of the invention to provide a switching means with a high contact security and protected against external influences, which, moreover, can ensure reliability over the entire product cycle.

According to the invention, the object is achieved by the features of independent claim 1. Advantageous embodiments are specified in the dependent claims. It should be noted, however, that the embodiments described below are not limiting; rather, any possible variations of the features described in the description, the dependent claims and the drawings are possible.

According to Claim 1, the object of the invention is achieved by providing a locking device for a plug connector half, whereby the locking device is driven by an electric motor, for establishing an electrical connection to another plug connector half in order to charge an electric vehicle or a hybrid vehicle by plugging the other plug connector half into the plug connector half, the locking device comprising a movable locking pin for locking the other plug connector half that has been plugged into the plug connector half, and a sensor element that is arranged on the locking pin and is in the form of a conductor track structure, it being possible to establish an electrical contact with the conductor track structure by means of resilient contact tabs and to provide a means for protecting the contact tabs at least in the region of the contact tabs. By forming a protective means for the contact tabs, contact security can be achieved for the conductor track structure. The locking device and, in particular, the plug connector half is used in a region that can be exposed to external weather influences in a massive way. Thus, the plug connector halves on the motor vehicle are usually arranged behind a flap, in such a way that, for example, the other plug connector half can be inserted into the motor vehicle in the form of a plug.

If the plug is now locked by means of the locking device, the plug connector halves are directly under the influence of external weather conditions. In this case, snow, rain and/or dust can permeate into the region of the plug connector halves and make contacting and/or releasing the connection more difficult. In any case, the locking pin comes into engagement with the other plug connector half and is moved out of the locking device at least in regions. Environmental influences, temperature differences and/or moisture can influence the contacting of the conductor track structure. In addition to the environmental influences, however, mechanical stresses also act on the locking pin. If, for example, in the locked state, that is to say when the locking pin is extended, the plug is pulled or the plug is moved, this mechanical stress acts directly on the locking pin. In order to cope with these influences on the locking device and to ensure contact security, the means according to the invention for protecting the contact tabs can protect the region of the contact tabs and thus give the conductor track structure a higher level of security.

The locking device driven by an electric motor is used for electric or hybrid vehicles, in particular, where a charging process is required for the vehicle. Preferably, a plug connector half in the form of a plug socket is located in the motor vehicle, wherein the locking device is preferably arranged on the plug socket in the motor vehicle. By means of the electric motor drive, the locking pin can be moved out of the locking device and into an opening for the plug. For this purpose, an electric motor with, for example, a worm gear drive is preferably arranged in the locking device in such a way that mechanical driving of the locking pin is made possible. Of course, combinations of transmissions and gear racks for driving the locking pin are also conceivable according to the invention. A plug is preferably inserted into the plug connector half, i.e., the plug socket in the motor vehicle, wherein the plug is inserted into an opening on the plug connector half. Only when the plug is fully inserted into the socket is it possible to bring the locking pin into the area of the opening and thus into engagement with the plug. This type of lock can ensure safe electrical charging of the motor vehicle.

In order to test the end position of the locking pin, a conductor track structure is arranged on the locking pin, which interacts with conductor tracks in the locking device. A functional interaction between the conductor track structure and further sensors in the locking device is disclosed byway of example in DE 10 2020 128 580.9. The disclosure content of the document is declared here to be part of the disclosure content of the application. In order to implement a switching means, conductor tracks are formed that are equipped with resilient contact tabs and can thus form a switching means or sensor element in interaction with conductor tracks in the locking device. According to the invention, the contact tabs are additionally protected by a protective means, whereby the contact tabs can be protected from external influences and thus the contact security can be increased.

If the protection is formed as a wall shielding the contact tabs, this results in an advantageous further development of the invention. The contact tabs can be formed as bent conductor tracks in such a way that the conductor tracks can be brought to rest against further conductor tracks in a resilient manner. Starting from a base plate, two spring arms can thus extend away from the base plate, as bent conductor tracks, and can be brought into contact with the further conductor tracks in a resilient manner. The resilient ends of the conductor track structure can thus be brought to rest against the conductor track under pretension.

If protective walls or at least one protective wall are now arranged in the locking device in such a way that the resilient ends of the conductor track structure can be protected, the operational safety of the locking device can be increased. The protective wall can extend so far over the resilient ends of the conductor track structure so that only the ends of the contact tabs project beyond the wall. It can thus be ensured that, in the event of an external stress on the locking device in the event of a mechanical stress on the contact tabs, the contact tabs are only slightly elastically deformed until the force acts on the protective wall, and the protective wall consequently prevents a plastic deformation of the contact tabs. However, the protective wall can also protect against external influences; if, for example, moisture can permeate through an opening, the protective wall can dissipate the moisture.

Alternatively and in an advantageous further development of the invention, the protective wall is arranged at least in regions parallel to the course of the contact tabs in the locking device. A parallel arrangement of the protective wall with respect to the contact tabs can, on the one hand, advantageously protect the contact tabs of the conductor track structure and, on the other hand, enable easy assembly of the conductor track structure. If two symmetrically arranged protective walls run parallel to and at a distance from the contact tabs, the protective walls form an insertion opening for the conductor track structure, which also facilitates assembly. In addition to the protective effect, the protective walls also have a guiding function in this case. Depending on the selected spacing of the protective walls, the protective walls can also be used for assembling the conductor track structure if the conductor track structure can be inserted, for example, in a clamping manner, i.e., in a form-fitting manner, and at least in regions into the protective walls.

It can also be advantageous and form an embodiment of the invention if two contact tabs arranged in parallel are provided, and the protective wall encloses the contact tabs in a U-shaped manner. A U-shaped enclosing of the contact tabs makes it possible to protect the contact tabs circumferentially. This applies to mechanical stresses, but also to environmental influences in such a way that a high level of contact security can be ensured for the conductor track structure in interaction with the conductor tracks to be contacted. Furthermore, the U-shape can also serve as an assembly aid if, for example, regions of the U-shape of the protective wall serve as a stop during assembly of the conductor track structure. The U-shape encloses the conductor track structure and preferably the contact tabs to such an extent that the contact tabs are enclosed by the protective wall. In other words, the contact tabs only project beyond the protective wall for contacting the conductor track, whereas the conductor track structure is enclosed by the protective wall in a U-shaped manner.

If the protective wall is arranged on the locking pin, this results in a preferred embodiment of the invention. In an advantageous manner, the protective wall can be arranged directly on the locking pin in order to protect the conductive track structure. It can also be advantageous to fasten the conductor track structure directly to the locking pin, wherein a rear wall of the conductor track structure is fastened to the locking pin and the contact tabs extend at an angle or bent in the direction of the locking device or the conductor tracks in the locking device. The contact tabs project beyond the protective walls and contact the conductor track. In this way, the protective wall can advantageously absorb mechanical stresses on the locking pin, such as those that can occur when the charging plug is pulled out in the locked state. In this case, the stress is not transferred to the contact tabs, but the protective wall absorbs the mechanical stress when, for example, a tilting moment is introduced into the locking pin. The protective wall then serves as a support wall and thus prevents excessive mechanical stresses on the contact tabs. Consequently, the contact tabs are always stressed only in the elastic range in such a way that deformations and the resulting lack of contacting can be avoided.

It can also be advantageous and an embodiment variant of the invention if the locking pin is made from plastic and the protective wall is formed integrally with the locking pin. A one-piece design of the locking pin and the protective wall offers the possibility of a cost-effective structural design and, at the same time, offers the possibility of receiving the conductor track structure in a form-fitting manner in the locking pin. During shaping of the locking pin, on the one hand, a toothing on the locking pin can, of course, be formed in order to move the locking pin, but moreover, for example, a mounting groove can also be introduced into the locking pin in such a way that the conductor track structure can be inserted securely and in a positionally accurate way into the locking pin and can be connected to the locking pin.

In an advantageous manner, the conductive track structure can be inserted and/or clipped into the locking pin. Thus, assembly of the conductor track structure in the locking pin can be realized in the simplest manner and with simple structural means. In this case, for example, a stop and/or a form-fitting reception of the conductor track structure in the locking pin can also be realized during shaping. In an advantageous manner, these assembly aids for guiding, clipping or stopping are arranged in an inner region of the protective wall and advantageously in the interior of the U-shaped protective wall in such a way that the conductor track structure can be inserted into the U-shaped opening of the protective wall via the assembly groove. In addition, further outer guide means can, of course, be arranged on the locking pin, which enable secure moving of the locking pin. In an advantageous manner, the protective walls, or at least one protective wall, can also be designed as guide means.

If the contact tabs can be brought into engagement with conductor tracks of the locking device in such a way that a switching means can be produced, this again results in an advantageous embodiment variant of the invention. The contact tabs are part of a conductor track structure, which are preferably arranged on the locking pin. Thus, the contact tabs or the conductor track structure are arranged in the locking device in such a way that they can be displaced with respect to the conductor tracks of the locking device. If the contact tabs are now disengaged from the conductor tracks, a switching means can be realized by means of the conductor tracks and the conductor track structure. According to the present invention, contact security can be realized here even under strong stresses on the locking device, since the contact tabs are protected by the protective wall even under strong external stresses, for example. The contact tabs can be provided at the end with rounded portions or have a radius in such a way that, on the one hand, secure contacting and, on the other hand, low-noise contacting of the conductor track can be made possible. By means of the design according to the invention and preferably by the arrangement of the conductor track structure on the locking pin, secure contacting can be ensured over the entire product cycle, i.e., the service life of the locking device.

6

BRIEF DESCRIPTION OF DRAWINGS

The invention is explained in more detail below with reference to the accompanying drawings on the basis of a preferred embodiment. However, the principle applies that the embodiment does not limit the invention, but is merely an advantageous embodiment. The features shown can be implemented individually or in combination with further features of the description as well as the claims—individually or in combination.

In the figures.

DETAILED DESCRIPTION

Figure 1:
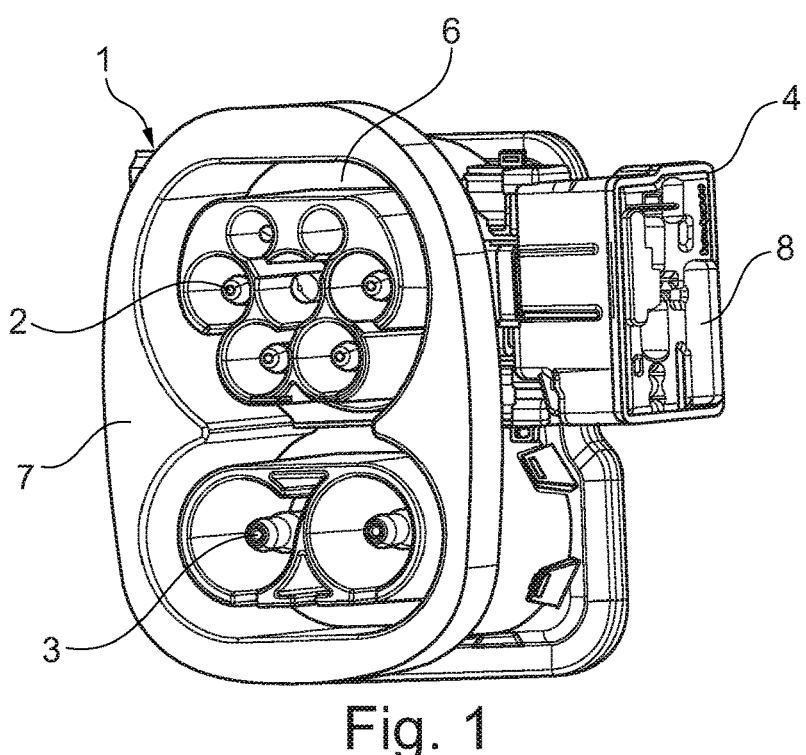
FIG. 1 shows a three-dimensional view of a plug connector half in the form of a socket as a socket for an electric vehicle or a hybrid vehicle with a locking device arranged on the housing for the plug connector half.

FIG. 1 shows a plug connector half 1 in the form of a socket 1 of an electric vehicle or a hybrid vehicle. The socket or plug connector 1 is shown from a front side, wherein a further plug connector half in the form of a plug for charging the electric or hybrid vehicle, which is not shown, can be inserted into the front side of the plug connector half 1. In this respect, the contacts 2, 3 for charging or rapid charging of the vehicle can be seen. If the plug has been inserted into the plug connector half 1, the further plug connector half inserted into the plug connector half 1 can be locked by means of a locking device 4. For this purpose, a locking pin 5 moves in the direction of an opening 6 for the further plug connector half in such a way that it is possible to prevent the further plug connector half from being pulled out. A frame 7 encloses the opening 6 and can be used to rest against the further plug connector half and/or to seal the plug connector halves.

Figure 2:
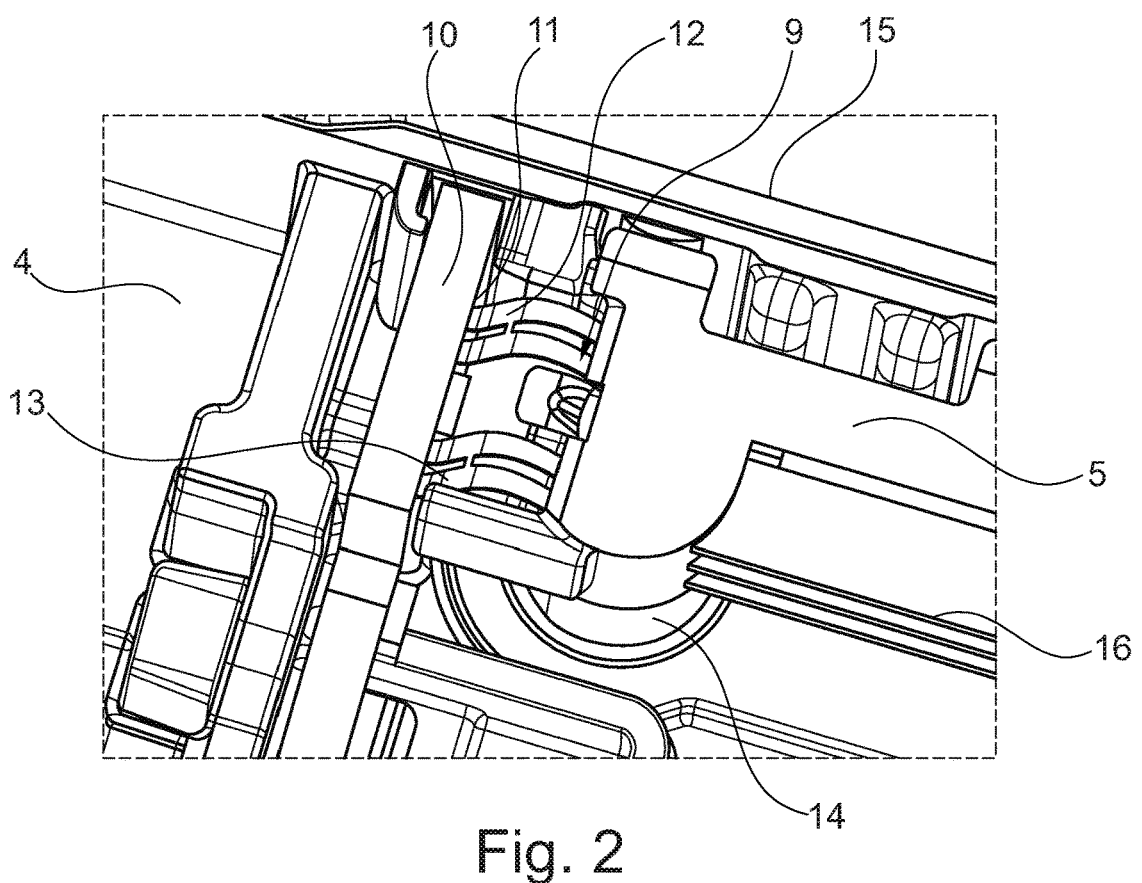
FIG. 2 shows a three-dimensional view of the locking device in the region of the locking pin with a view of the conductor track structure.
Figure 3:
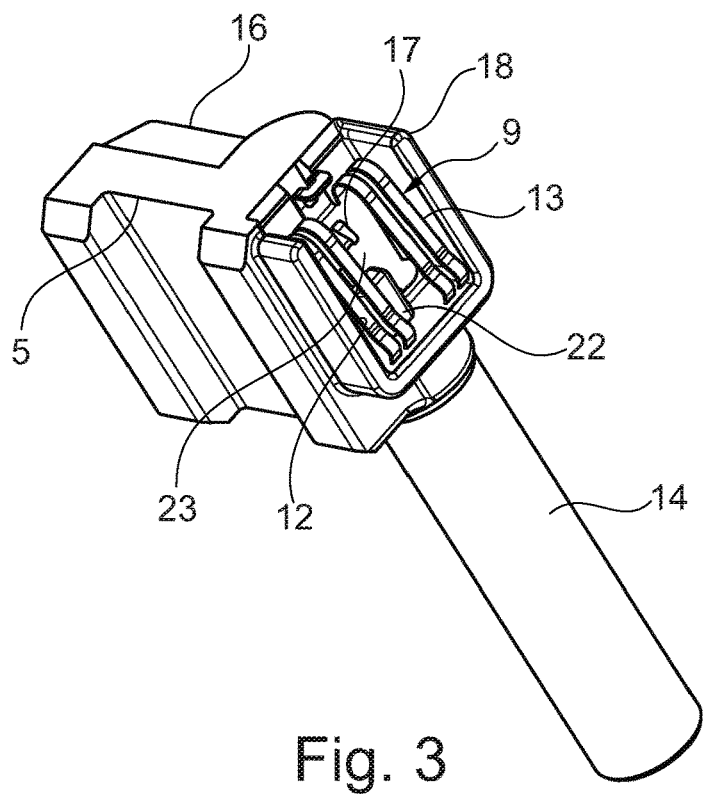
FIG. 3 shows the locking pin detached from the locking device with the contact tabs of the conductor track structure arranged on the locking pin.

FIG. 1 shows the locking device 4 with a housing cover 8. FIG. 2 shows the opened state of the locking device 4 in a view of the locking pin, a part of the conductor track structure 9 and an electrical component carrier 10. On the electrical component carrier 10, for example, a printed circuit board with the designation PCB-A, conductor tracks 11 are arranged in turn, which can be brought into engagement with the contact tabs 12, 13. The locking pin 5 can be moved in such a way that the contact tabs 12, 13 can be brought into engagement or out of engagement with the conductor tracks. As a result of the movement of the locking pin 5, a switching means can thus be provided in order to detect the position or a movement of the locking pin 5. For this purpose, the locking pin 5 has a cylindrical extension 14, which can be moved out of the housing 15 of the locking device 4. The locking pin 5 further has a toothing 16, into which, for example, a gear of a transmission for moving the locking pin 5 can engage.

In this embodiment, a part of the conductor track structure 9 is arranged on the locking pin 5. A ratchet connection 17 holds the contact tabs 12, 13 as part of the conductor track structure 9 on the locking pin 5. The contact tabs 12, 13 project beyond a protective wall 18 in such a way that the free ends 19, 20 of the contact tabs 12, 13 can come into contact with the conductor tracks 11.

In the present embodiment of the invention, the protective wall 18 encloses the conductor track structure 9 and, in particular, the contact tabs 12, 13 in a U-shaped manner in such a way that a circumferential protection around the contact tabs 12, 13 can be ensured. Mechanical stresses, such as pulling on the plug in the locked state, consequently do not act on the contact tabs 12, 13, but can at most cause the protective wall 18 to rest against the electrical compo-nent carrier 10. The protective wall 18 thus prevents a mechanical stress on the contact tabs 12, 13 and can thus serve to provide a high level of contact security. In particu-lar, the contact tabs 12, 13 can be assembled independently of external influences on the locking pin 5, thus ensuring reliability over the entire product cycle of the locking device 4.

Figure 4:
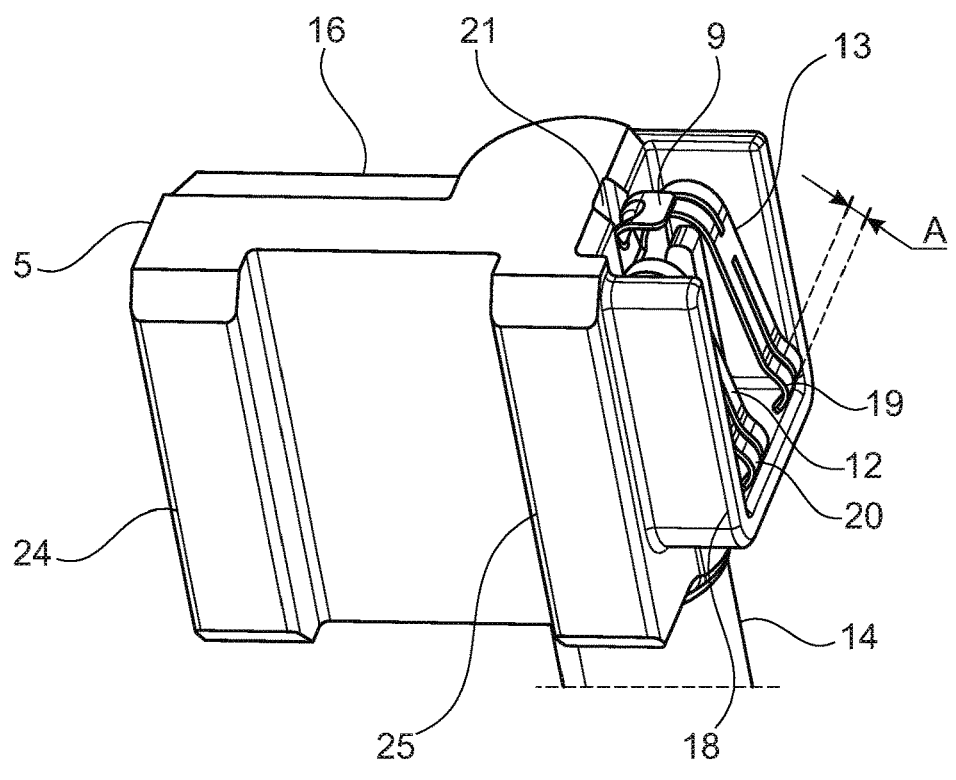
FIG. 4 shows another three-dimensional view of the locking pin and the contact tabs in a side view of the locking pin.

FIG. 4 shows an enlarged view of the protective wall 18 and the arrangement of the contact tabs 12, 13 or of the part of the conductor track structure 9. As can be clearly seen, the free ends 19, 20 project beyond the protective wall 18 and can thus be brought into engagement with the conductor tracks 11 on the printed circuit board 10. In this embodiment, the free ends 19, 20 of the contact tabs project beyond the protective wall 18 to such an extent that safe contacting of the conductor track 11 can be ensured. The projection of the free ends 19, 20 of the contact tabs 12, 13 is referenced as a spacing A in FIG. 1.

By protecting the contact tabs 12, 13 circumferentially or circumferentially at least in regions, it is possible, on the one hand, to ensure easy assembly of the conductor track struc-ture 9 and, at the same time, provide maximum protection for the contact tabs 12, 13. In the present embodiment, an assembly groove 21 is provided, into which the ratchet connection 17 can be inserted and into which a clip con-nection can engage. For this purpose, a further recess can be provided in the assembly groove 28. A stop 22 on the locking pin 5 can serve as an assembly aid for guiding and securely positioning the conductor track structure 9. By means of the stop 22, form-fitting connecting of the conductor track structure with the locking pin 5 can likewise be carried out if, for example, the conductor track structure 9 can be inserted or pushed into a rear wall behind the stop 22. Thus, a structurally favorable and secure connection of the con-ductor track structure 9 in the locking pin 5 can be ensured.

In particular, the orientation of the contact tabs 12, 13 in the direction of the cylindrical extension 14 of the locking pin 5 can ensure a structurally favorable connection to the conductor tracks 11 and limit the length of the conductor track 11 in the locking device 4 to a minimum. Thus, a switching means for the locking pin 5 can be provided with the least possible structural effort. On the side of the locking pin 5 opposite the toothing 16, guides 24, 25 are provided, which enable a stabilization of the locking pin 5 and, at the same time, can serve as support for engagement of a gear in the toothing 16.

LIST OF REFERENCE SIGNS

1 Plug connector half
2, 3 Contacts
4 Locking device
5 Locking pin
6 Opening
7 Frame
8 Housing cover
9 Conductor track structure

10 Electrical component carrier, printed circuit board
11 Conductor track
12, 13 Contact tabs
14 Cylindrical extension
15 Housing
16 Toothing
17 Ratchet connection
18 Protective wall
19,20 Free ends
21 Assembly groove
22 Stop
23 Rear wall
24, 25 Guides
A Spacing

The invention claimed is:

1. An electric motor driven locking device of a plug connector half for establishing an electrical connection to another plug connector half in order to charge an electric vehicle or a hybrid vehicle by plugging the another plug connector half into the plug connector half, the locking device comprising:
  a housing with an electrical component carrier,
  a movable locking pin movable relative to the housing for locking in the another plug connector half plugged into the plug connector half,
  a sensor element that is arranged on the locking pin and is configured as a conductor track structure including resilient contact tabs, an electrical contact being estab-lished between the electrical component carrier and the conductor track structure by the resilient contact tabs, wherein the movable locking pin is movable between a first position where the resilient contact tabs are spaced from the electrical component carrier and a second position where the resilient contact tabs engage the electrical component carrier, and
  a protection for protecting the contact tabs that is provided at least in a region of the contact tabs, wherein the protection extends around a portion of the resilient contact tabs.

2. The locking device according to claim 1, wherein the protection is a protective wall shielding the contact tabs.

3. The locking device according to claim 2, wherein the protective wall is arranged at least in regions parallel to a course of the contact tabs.

4. The locking device according to claim 2, wherein two contact tabs of the resilient contact tabs are arranged in parallel and the protective wall encloses the contact tabs in a U-shaped manner.

5. The locking device according to claim 2, wherein the protective wall is arranged on the locking pin.

6. The locking device according to claim 2, wherein the locking pin is made from plastic and the protective wall is formed integrally with the locking pin.

7. The locking device according to claim 2, wherein the protective wall at least partially encloses the conductor track structure and only one end of the contact tabs projects beyond the protective wall.

8. The locking device according to claim 1, wherein the conductor track structure is clipped to and/or inserted into the locking pin.

9. The locking device according to claim 1, wherein the contact tabs are bent portions of the conductor track struc-ture that are pretensioned relative to a base plate of the conductor track structure.

10. The locking device according to claim 1, wherein the protection includes two symmetrically arranged protective walls that run parallel to and at a distance from the contact tabs, and that forms an insertion opening for the conductor track structure.

11. The locking device according to claim 1, wherein the conductor track structure is fastened directly to the locking pin.

12. The locking device according to claim 11, wherein a rear wall of the conductor track structure is fastened to the locking pin and the contact tabs extend at an angle in a direction of the locking device.

13. The locking device according to claim 1, wherein the locking pin includes a mounting groove and the conductive track structure is inserted into the mounting groove.

14. The locking device according to claim 1, wherein the conductor track structure includes a ratchet connection that holds the contact tabs on the locking pin.

15. The locking device according to claim 1, wherein locking pin includes a stop that guides positioning of the conductor track structure.

16. A motor vehicle charging structure comprising:

a locking device according to claim 1, an electric motor that electrically drives movement of the locking pin of the locking device, the plug connector half being configured as a plug socket, wherein the locking device is arranged in the plug socket, and wherein the plug socket is configured to receive the another plug connector half and the locking pin is driven to lock the another plug connector half in the plug socket.

* * * * *